(12) United States Patent
Matsui

(10) Patent No.: US 7,565,667 B2
(45) Date of Patent: Jul. 21, 2009

(54) DISC APPARATUS HAVING BLOWER FOR SELECTIVELY DIRECTING AIR TO PICKUP OR LOADING DEVICE

(75) Inventor: Takeshi Matsui, Tokyo (JP)

(73) Assignee: Sony Corporation, Tokyo (JP)

( * ) Notice: Subject to any disclaimer, the term of this patent is extended or adjusted under 35 U.S.C. 154(b) by 609 days.

(21) Appl. No.: 11/485,836

(22) Filed: Jul. 13, 2006

(65) Prior Publication Data

US 2007/0028249 A1 Feb. 1, 2007

(30) Foreign Application Priority Data

Jul. 27, 2005  (JP) .............................. 2005-216945

(51) Int. Cl.
  *G11B 33/14* (2006.01)
  *G11B 7/12* (2006.01)
(52) U.S. Cl. ...................... 720/648; 720/606; 720/626; 720/649; 720/671
(58) Field of Classification Search ................ 720/606, 720/626, 648, 649, 671
  See application file for complete search history.

(56) References Cited

U.S. PATENT DOCUMENTS 4,771,412 A * 9/1988 Aihara et al. ............... 720/649
5,297,116 A * 3/1994 Ikuma ........................ 720/649
5,335,217 A * 8/1994 Kaneda et al. .............. 720/648
5,493,457 A * 2/1996 Kawamura et al. .......... 720/648
7,421,720 B2 * 9/2008 Wakabayashi et al. ...... 720/649

FOREIGN PATENT DOCUMENTS

| JP | 59165253 A | * | 9/1984 |
| JP | 61162885 A | * | 7/1986 |
| JP | 62040641 A | * | 2/1987 |
| JP | 02066714 A | * | 3/1990 |
| JP | 08077765 A | * | 3/1996 |
| JP | 2000090657 A | * | 3/2000 |
| JP | 2002184167 A | * | 6/2002 |
| JP | 2003109373 A | * | 4/2003 |
| JP | 2004220658 A | * | 8/2004 |

* cited by examiner

*Primary Examiner*—William J Klimowicz
(74) *Attorney, Agent, or Firm*—Wolf, Greenfield & Sacks, P.C.

(57) ABSTRACT

A recording-medium driving apparatus includes a loading unit in which a removable recording medium is loaded, an access unit that accesses the recording medium loaded in the loading unit, a detector that detects the relationship between the recording medium and the loading unit, an air-direction adjustment controller that determines to which of the loading unit and the access unit air is sent, on the basis of the detection performed by the detector, and a blower that sends the air to one of the loading unit and the access unit on the basis of the determination made by the air-direction adjustment controller.

17 Claims, 10 Drawing Sheets

DISC APPARATUS HAVING BLOWER FOR SELECTIVELY DIRECTING AIR TO PICKUP OR LOADING DEVICE

CROSS REFERENCES TO RELATED APPLICATIONS

The present invention contains subject matter related to Japanese Patent Application JP 2005-216945 filed in the Japanese Patent Office on Jul. 27, 2005, the entire contents of which are incorporated herein by reference.

BACKGROUND OF THE INVENTION

1. Field of the Invention

The present invention relates to a recording-medium driving apparatus, and more particularly, to a disc apparatus that drives a disc-shaped recording medium.

2. Description of the Related Art

In recording-medium driving apparatuses, access to a recording medium is performed in a contact manner or a noncontact manner in order to read data recorded on the recording medium or to write new data onto the recording medium. For example, when the recording medium is an optical disc, an optical head having a lens accesses the optical disc that is clamped by a spindle motor.

In such recording-medium driving apparatuses using an optical head, the gap between the recording medium and an objective lens for data reading and writing tends to decrease with increases in capacity and density. When the recording medium is a CD (compact disc), laser light passes through a substrate having a thickness of 1.2 mm. When the recording medium is a DVD (digital versatile disk) serving as a bonded medium, laser light passes through a substrate having a thickness of 0.6 mm. In a Blu-ray Disc, laser light reaches a recording layer through a protective layer having a thickness of 0.1 mm, and the gap between the disc and the objective lens is of the order of hundreds of micrometers.

In order to achieve large capacity and high density, near-field technology using near-field light and an objective lens called a solid immersion lens (SIL) has been proposed. A recording-medium driving apparatus using near-field technology uses the following property of laser light. That is, in a case in which the refractive index n and the numerical aperture (NA) of the objective lens are increased, all incident laser light is returned (totally reflected) when the gap between the objective lens and a recording medium is large, and a slight amount of laser light leaks when the gap is small. The objective lens including an SIL has a numerical aperture NA of 1 or more, and a density of 80 gigabyte/inch is achieved by this technology.

In this recording-medium recording apparatus using an optical head, a removable recording medium is clamped by a spindle motor, and vertical or radial deviation of the clamped recording medium sometimes causes a problem. There are various causes of deviation, for example, vertical movement of a shaft of the spindle motor, working accuracy of a clamp hub of the spindle motor on which the recording medium is placed, and warping of the recording medium. It is also conceivable that deviation is caused by displacement of the recording medium due to adhesion of dust present in the air onto the clamp hub.

Even when a large deviation of ±40 μm occurs between a recording medium having a relatively small capacity, such as a CD or a DVD, and the shaft, the influence of deviation can be absorbed by a focusing servo provided in an actuator including the objective lens. However, in near-field technology, the gap between the recording medium and the objective lens is set to be approximately 100 nanometers or less in order to avoid total reflection. Moreover, in order to read signals, it is necessary to maintain an extremely small gap of at least tens of nanometers. Therefore, the recording medium and the objective lens may collide with each other even when the gap therebetween slightly varies. In this way, vertical or radial deviation is influential particularly in the near-field technology.

In contrast, in a hard disk apparatus using magnetic recording, a small gap of 10 to 20 nanometers is provided between a magnetic head and a recording medium. However, collision between the magnetic head and the recording medium is avoided by employing a flying head that flies because of a flying force produced by the rotation of the recording medium. Further, Japanese Examined Patent Application Publication No. 64-4276 discloses, in FIG. 3, a hard disk apparatus that includes an inner filter for removing the influence of dust in the air.

SUMMARY OF THE INVENTION

In the above-described recording-medium driving apparatus using the optical head, the gap between the recording medium and the objective lens decreases as the recording density increases. Therefore, it is difficult to normally read and write data unless the amount of vertical or radial deviation is limited to ±10 μm or less. In a driving apparatus, for a removable recording medium having a relatively small capacity, when the amount of deviation is large, a heavy burden is given to a wire of the actuator, and the life of the actuator is shortened.

In this way, a large deviation causes data reading and writing errors, and may adversely affect the recording medium itself.

While deviation can occur from various causes, as described above, particularly when a removable recording medium is used, the amount of deviation may be markedly increased by the entry of dust into a clamp area provided between the clamp hub of the spindle motor and the recording medium. In particular, since the clamp hub faces upward, dust easily collects thereon.

Accordingly, it is desirable to appropriately remove dust from a position where a removable recording medium is placed.

A recording-medium driving apparatus according to a first embodiment of the present invention includes a loading means in which a removable recording medium is loaded; an access means that accesses the recording medium loaded in the loading means; a detecting means that detects the relationship between the recording medium and the loading means; an air-direction adjustment control means that determines to which of the loading means and the access means air is sent, on the basis of the detection performed by the detecting means; and a blower means that sends the air to one of the loading means and the access means on the basis of the determination made by the air-direction adjustment control means. In this case, control is executed to determine to which of the loading means and the access means air is sent, depending on the relationship between the recording medium and the loading means.

A disc apparatus according to a second embodiment of the present invention includes a clamp means that clamps a disc-shaped removable recording medium; a pickup means that performs reading from and writing onto the recording medium clamped by the clamp means; a detecting means that detects the relationship between the recording medium and the clamp means; an air-direction adjustment control means that determines to which of the clamp means and the pickup means air is sent, on the basis of the detection performed by the detecting means; and a blower means that sends the air to one of the clamp means and the pickup means on the basis of the determination made by the air-direction adjustment control means. In this case, control is executed so that air is sent to one of the clamp means and the pickup means, depending on the relationship between the recording medium and the clamp means.

Preferably, the detecting means detects whether a loading operation of clamping the disc-shaped recording medium by the clamp means is being performed, and the air-direction adjustment control means determines to send air to the clamp means when the loading operation is being performed, and determines to send air to the pickup means in other cases. In this case, the air sending direction can be controlled in conjunction with the loading operation of clamping the recording medium.

Preferably, the detecting means detects whether the disc-shaped recording medium is clamped by the clamp means, and the air-direction adjustment control means determines to send air to the pickup means when the recording medium is clamped by the clamp means, and determines to send air to the clamp means when the recording medium is not clamped by the clamp means. In this case, the air sending direction can be controlled in conjunction with the clamping state of the recording medium.

Preferably, the blower means includes a suction means that sucks air, and an air-direction adjusting means that adjusts the direction of the air sucked by the suction means on the basis of the determination made by the air-direction adjustment control means. In this case, the direction of sucked air is adjusted by the air-direction adjusting means. The air-direction adjusting means may include at least one louver or at least one nozzle. The blower means may further include a cleaning means that cleans the air sucked by the suction means.

A disc apparatus according to a third embodiment of the present invention includes a clamp means that clamps an optical disc serving as a removable recording medium; an optical pickup means that performs reading from and writing onto the optical disc clamped by the clamp means; a detecting means for detecting the relationship between the optical disc and the clamp means; an air-direction adjustment control means that determines to which of the clamp means and the optical pickup means air is sent, on the basis of the detection performed by the detecting means; and a blower means that sends the air to one of the clamp means and the optical pickup means on the basis of the determination made by the air-direction adjustment control means. In this case, control is executed so that air is sent to one of the clamp means and the optical pickup means, depending on the relationship between the optical disc and the clamp means.

The optical pickup means may include an objective lens having a numerical aperture of 1 or more. The objective lens may be formed of a solid immersion lens (SIL). When this objective lens is used, an extremely small gap of at least tens of nanometers is provided between the optical disc and the objective lens. Therefore, the air direction control according to the embodiment of the present invention is particularly useful.

A disc apparatus according to a fourth embodiment of the present invention is hermetically sealed by a housing. In this case, the housing may have an opening through which a filter means that cleans sucked air can be attached and detached. Consequently, the filter means can be easily replaced while maintaining a sealed state in the housing.

In the apparatuses according to the embodiments of the present invention, dust can be appropriately removed so as not to adhere to a mounting portion for a removable recording medium.

DESCRIPTION OF THE PREFERRED EMBODIMENTS

An embodiment of the present invention will be described in detail below with reference to the drawings.

Figure 1:
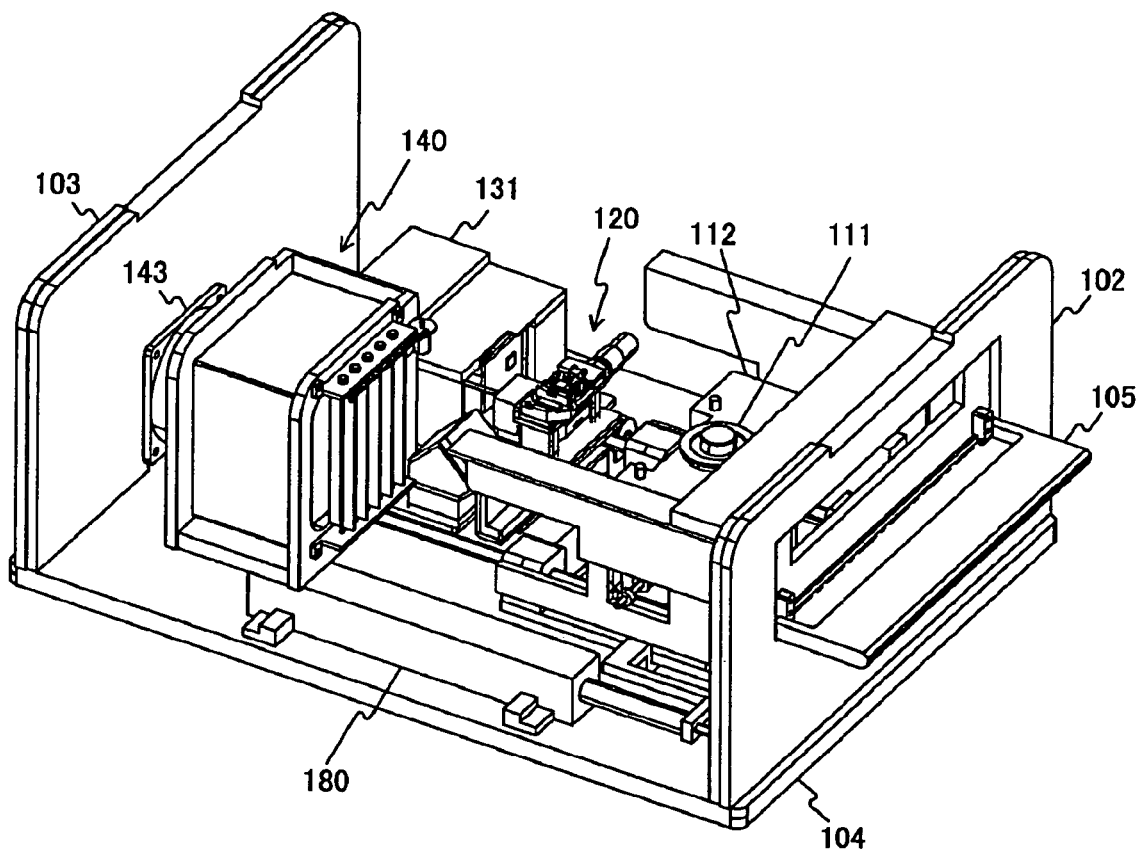
FIG. 1 is an explanatory view showing an inner configuration of an optical disc apparatus serving as a recording-medium driving apparatus according to an embodiment of the present invention.

FIG. 1 shows an internal configuration of an optical disc apparatus serving as a recording-medium driving apparatus according to an embodiment of the present invention. While a cover of a housing is not shown in FIG. 1, it is mounted at the top of the apparatus during use, and the interior of the apparatus is not seen from the outside.

In the optical disc apparatus, mechanisms are mounted on a base plate 104. A front panel 102 and a back panel 103 are respectively provided at the front and rear of the apparatus, and form an outline of the housing with the cover. The front panel 102 has a movable tray cover 105. In a state in which the tray cover 105 is open, an optical disc serving as a removable recording medium can be loaded and unloaded.

An optical disc is loaded on a clamp hub 111 that is horizontally rotated by a spindle motor. A section disposed under the clamp hub 111 is surrounded by a motor holder 112, and is not shown in FIG. 1.

An actuator 120 serves as an optical pickup, and performs reading from and writing onto an optical disc with an objective lens provided at a leading end thereof. The objective lens may be formed of a normal far-field lens, or formed of a solid immersion lens (SIL) for larger capacity and higher density. When the SIL is used, the numerical aperture (NA) is 1 or more, and there is an extremely small gap of at least tens of nanometers between the optical disc and the SIL. Therefore, deviation is highly influential.

When the actuator 120 is a two-axis actuator, it includes a tracking coil and a focus coil. The tracking coil executes tracking servo control for following tracks on the optical disc, and the focusing coil executes focusing servo control for focusing on the optical disc. While the actuator 120 in this embodiment is a two-axis actuator, it may be another type of actuator, for example, a three-axis actuator further including a tilting mechanism for radial tilting and tangential tilting.

Laser light read from the optical disc by the actuator 120 enters an optical lens unit. The optical lens unit is surrounded by an optical-system cover 131, and is not shown in FIG. 1. Laser light is supplied to the objective lens of the actuator 120 via the optical lens unit, and light reflected by the optical disc returns to the optical lens unit, and is detected by a photodetector. In addition to a main photodetector for detecting signals, another detector is sometimes provided to detect a tracking error and a focus error.

A sled unit 180 has a sled motor and a ball screw therein, and moves a clamp connected to the clamp hub 111 in the radial direction of the optical disc. The sled unit 180 can detect the radial position on the optical disc, for example, with reference to address information acquired from the optical disc. While the optical disc and the objective lens are moved closer to each other by moving the clamp in the embodiment, they may be moved by moving the actuator 120.

A blower 140 sends air so as to provide air circulation in the optical disc apparatus. Air is sucked by a fan 143 disposed in the blower 140, and is supplied from a supply opening provided on the opposite side of the fan 143. The configuration of the blower 140 will be described below.

Figure 2:
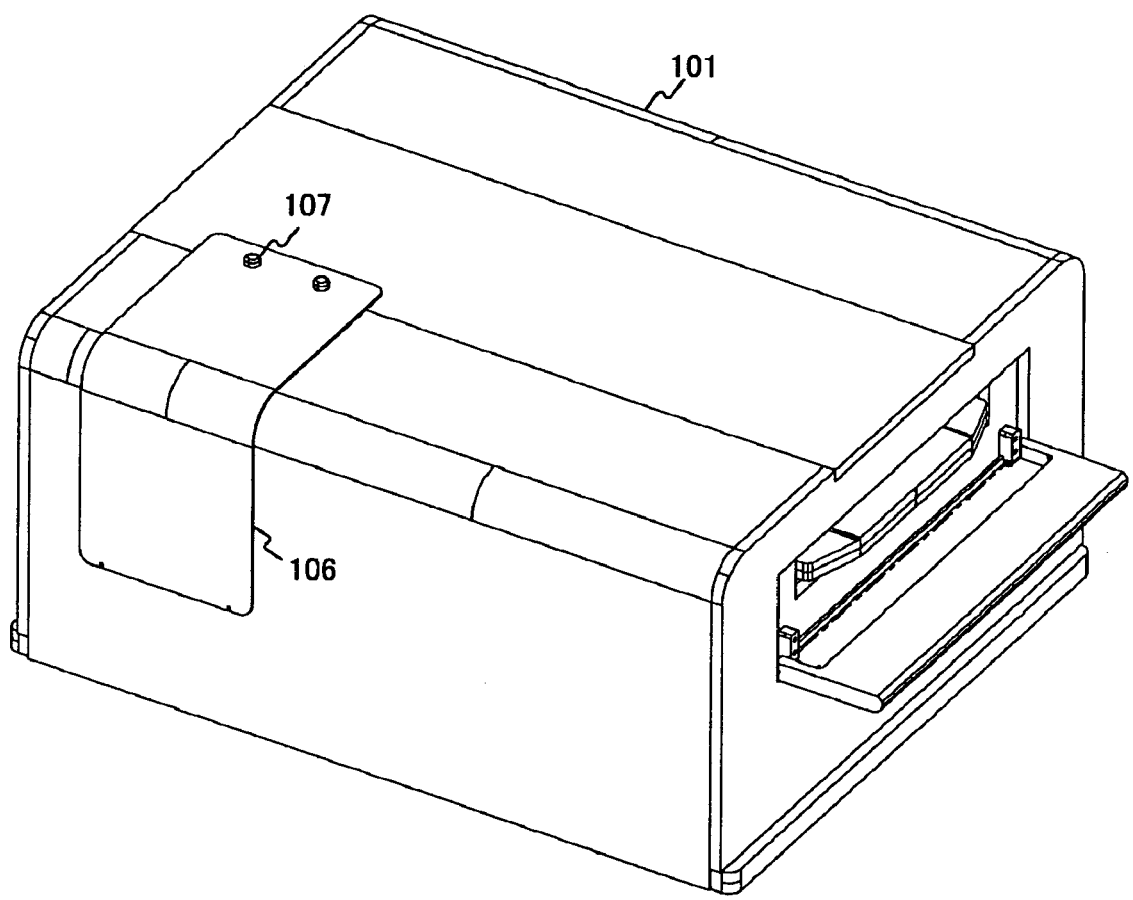
FIG. 2 is an external view of the optical disc apparatus.

FIG. 2 shows the outer appearance of the optical disc apparatus. Three sides of the optical disc apparatus are covered with a cover 101. The cover 101, the base plate 104, the front panel 102, and the back panel 103 constitute the housing of the optical disc apparatus.

The cover 101 has an opening in which a filter is stored. During use, a filter cover 106 is attached at the opening by mounting screws 107. Accordingly, in a state in which the tray cover 105 is closed, the interior of the optical disc apparatus is hermetically sealed. This structure allows the filter to be replaced appropriately.

Figure 3:
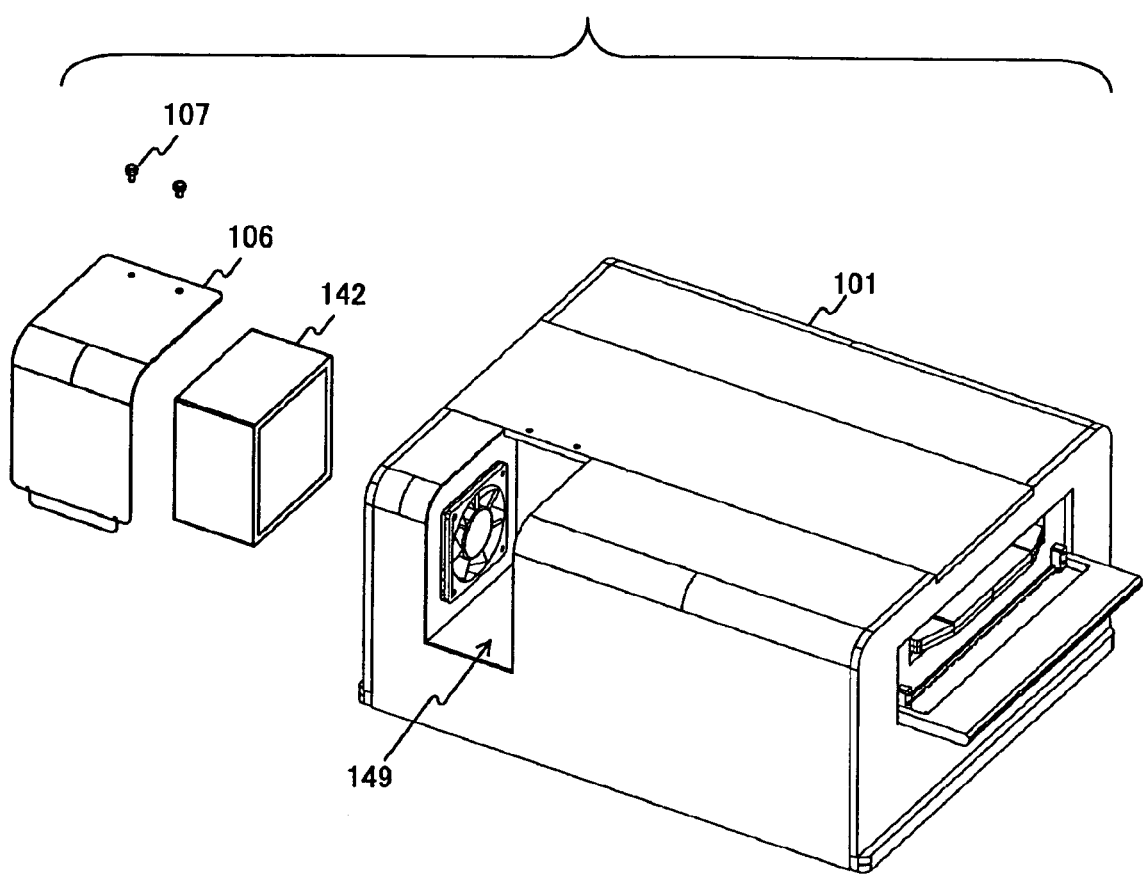
FIG. 3 is an explanatory view of the optical disc apparatus from which a filter cover is removed.

FIG. 3 shows a state in which the filter cover 106 is removed from the optical disc apparatus. During use, a filter 142 can be placed in a filter storage space 149. The fan 143 is disposed adjacent to the filter storage space 149, and air sucked into the housing by the fan 143 is cleaned by the filter 142.

Figure 4:
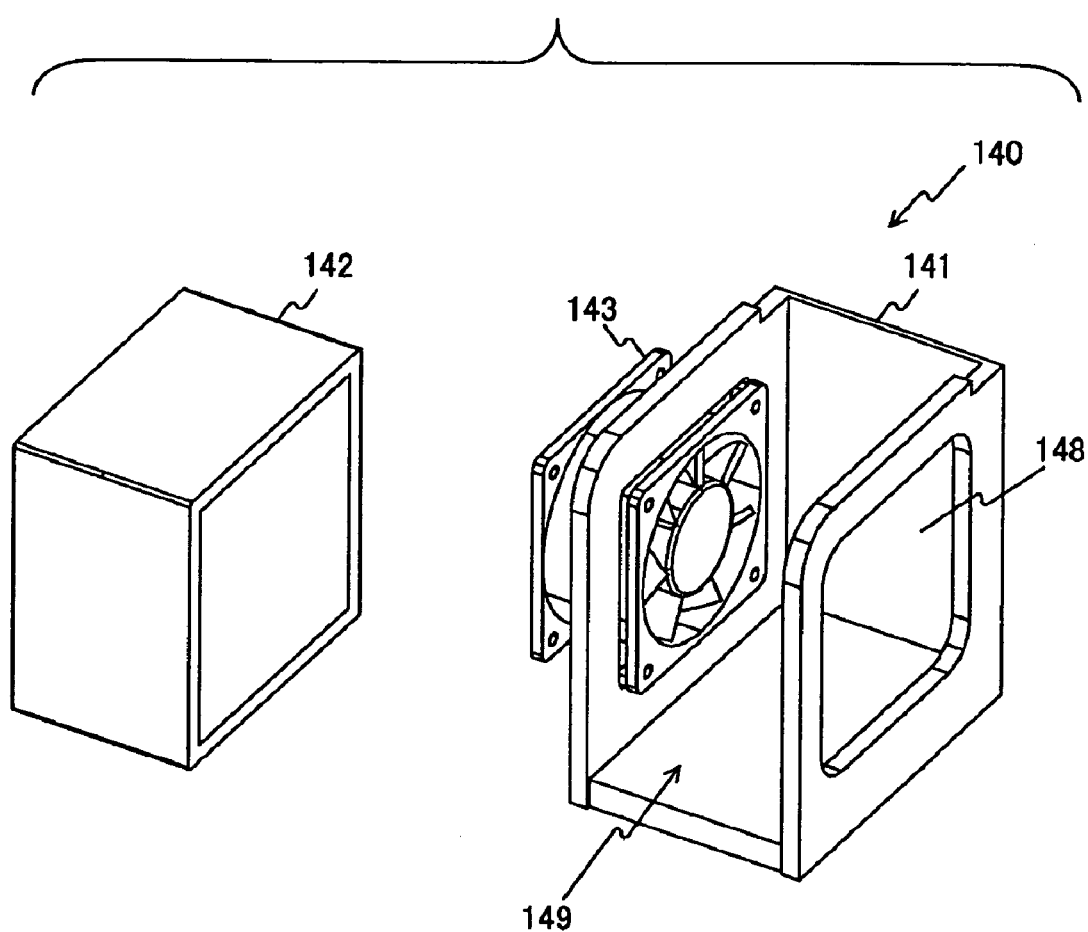
FIG. 4 is an exploded view of a blower in the embodiment.

FIG. 4 is an exploded view of the blower 140. In the blower 140, the fan 143 is attached to a filter holder 141. The interior of the filter holder 141 serves as the filter storage portion 149, and the filter 142 can be placed therein, as required.

Figure 5:
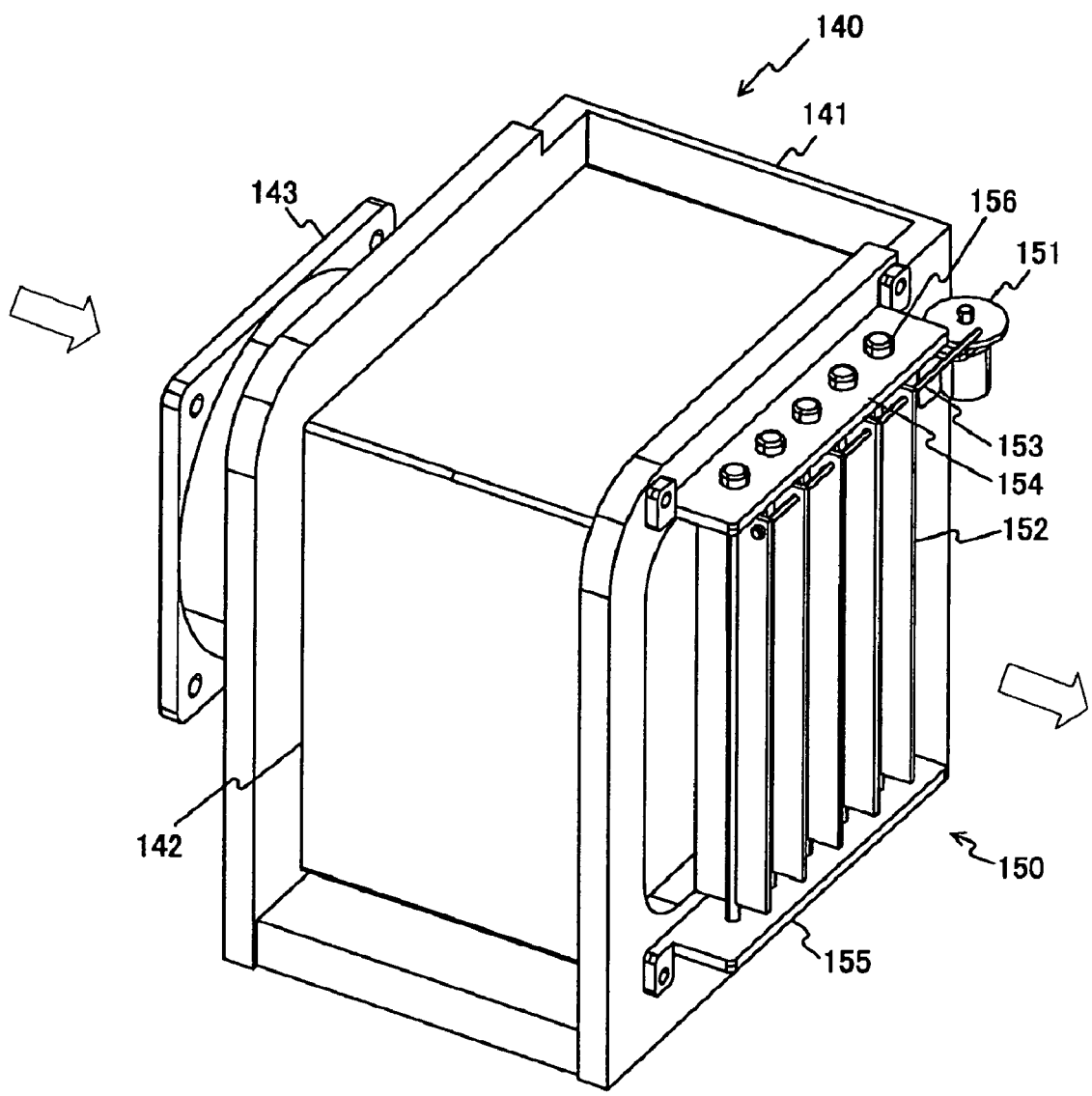
FIG. 5 is an assembly view of the blower.

FIG. 5 is an assembly view of the blower 140. An air-direction adjuster 150 is provided on a side of the filter holder 141 opposite to the fan 143. The air-direction adjuster 150 adjusts the direction of sent air, for example, by five louvers 152.

The angle of the louvers 152 is changed by a motor 151 via a link 153, and are vertically supported by louver supports 154 and 155. Each of the louvers 152 is supported by a shaft 156 at the louver supports 154 and 155, and is fixed such as to rotate about the shaft 156. When the link 153 is moved by the motor 151 in the lateral direction, the louver 152 is thereby rotated about the shaft 156.

While the air direction is adjusted by the five louvers 152 in this embodiment, the number of louvers is not limited to five. Further, while the louvers 152 are connected to the motor 151 by the link 153, they may be directly rotated by the motor 151 without using the link mechanism.

Figure 6:
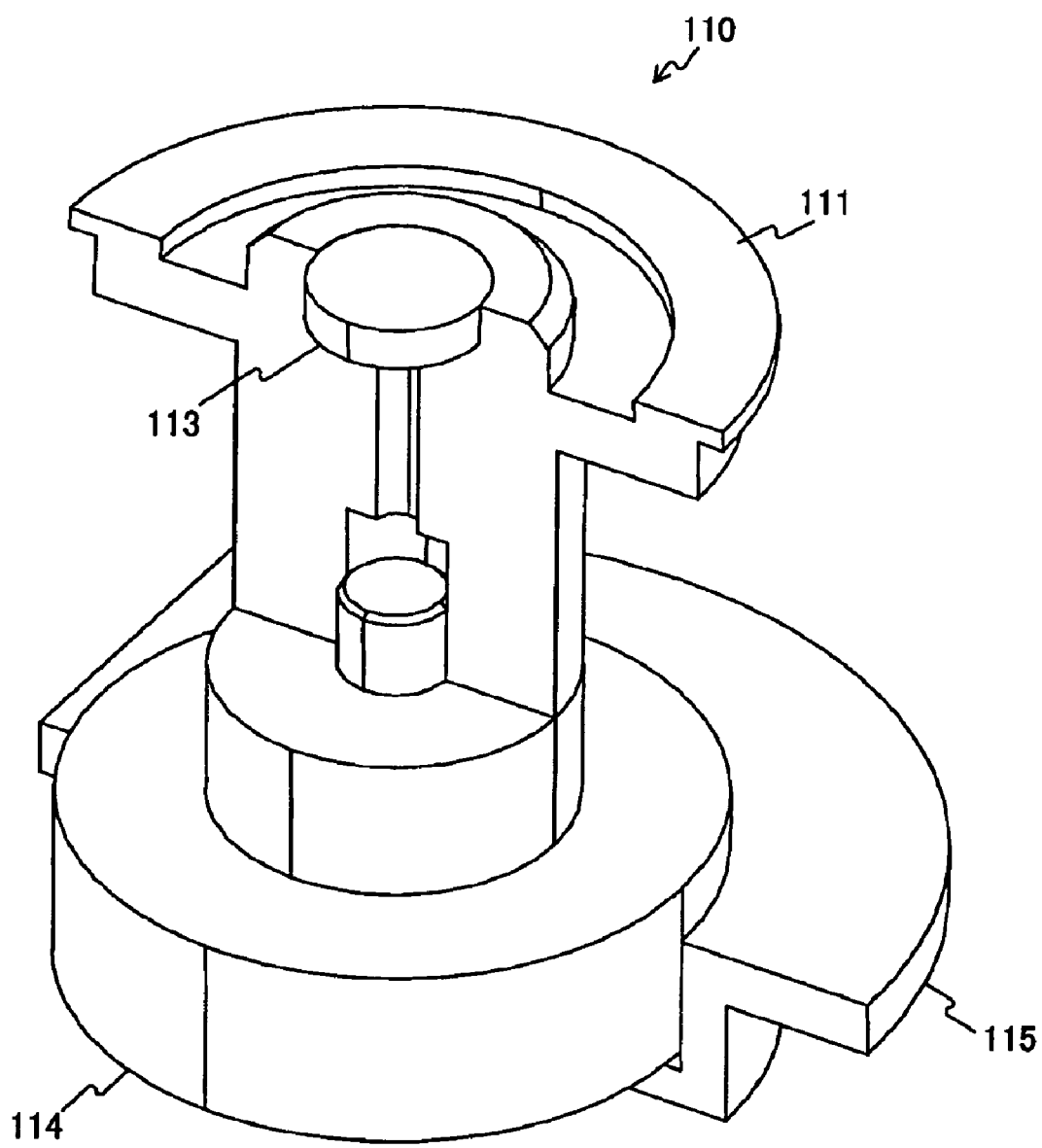
FIG. 6 is an explanatory view showing a cross section of a clamp in the embodiment.
Figure 7:
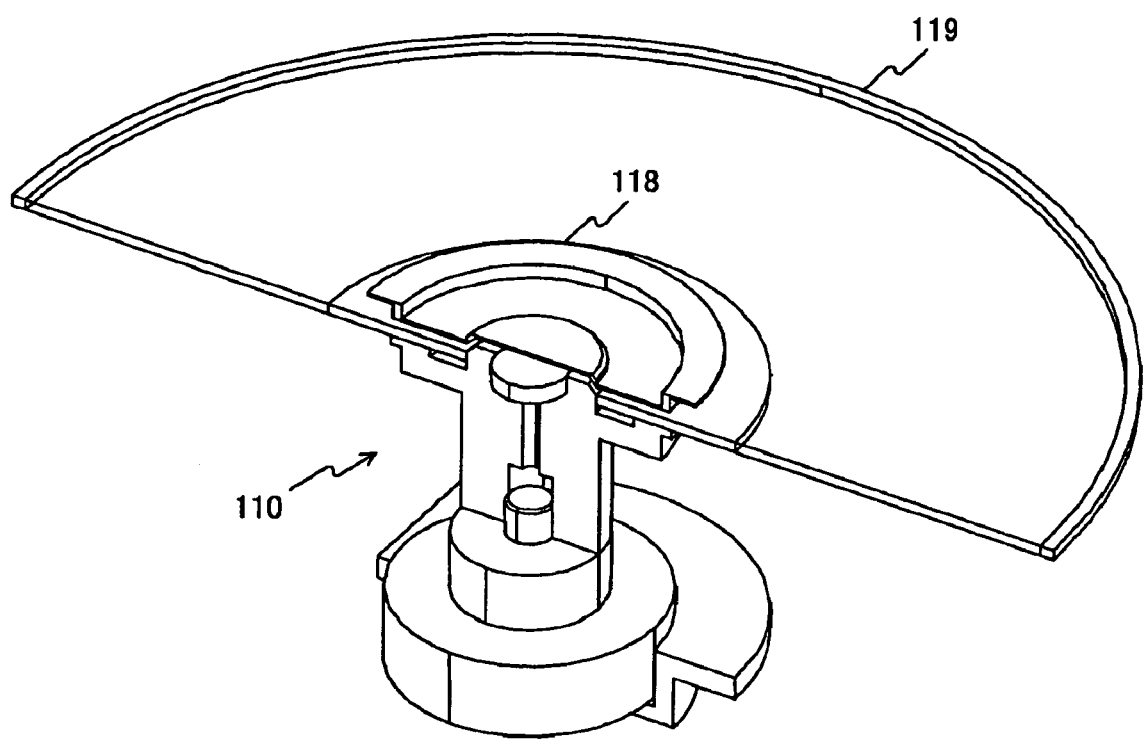
FIG. 7 is an explanatory view showing a cross section of the clamp on which an optical disc is mounted.

FIGS. 6 and 7 show the sectional structure of a clamp 110. An optical disc 119 is loaded on the clamp hub 111. A center magnet 113 is provided at the center of the clamp hub 111, and the optical disc 119 is vertically clamped between the center magnet 113 and an upper clamp 118, as shown in FIG. 7.

A rotor 114 is provided below the clamp hub 111 for rotating operation. The rotor 114 is rotated by a spindle motor disposed in a motor housing 115.

The clamp hub 111 faces up in an uncovered state when no optical disc is loaded thereon, as shown in FIG. 6. Therefore, dust easily adheres onto the clamp hub 111. Particularly when an optical disc 119 is loaded, air enters from the outside, and therefore, dust may enter between the clamp hub 111 and the optical disc 119.

Accordingly, dust on the clamp hub 111 is blown away by the blower 140 shown in FIG. 5. In contrast, when an optical disc has already been loaded on the clamp hub 111, there is a low risk that dust will enter between the clamp hub 111 and the optical disc. Therefore, it is better to send air to the actuator 120 that accesses the optical disc and its surroundings. For that purpose, the air direction is adjusted by the air-direction adjuster 150.

Figure 8A:
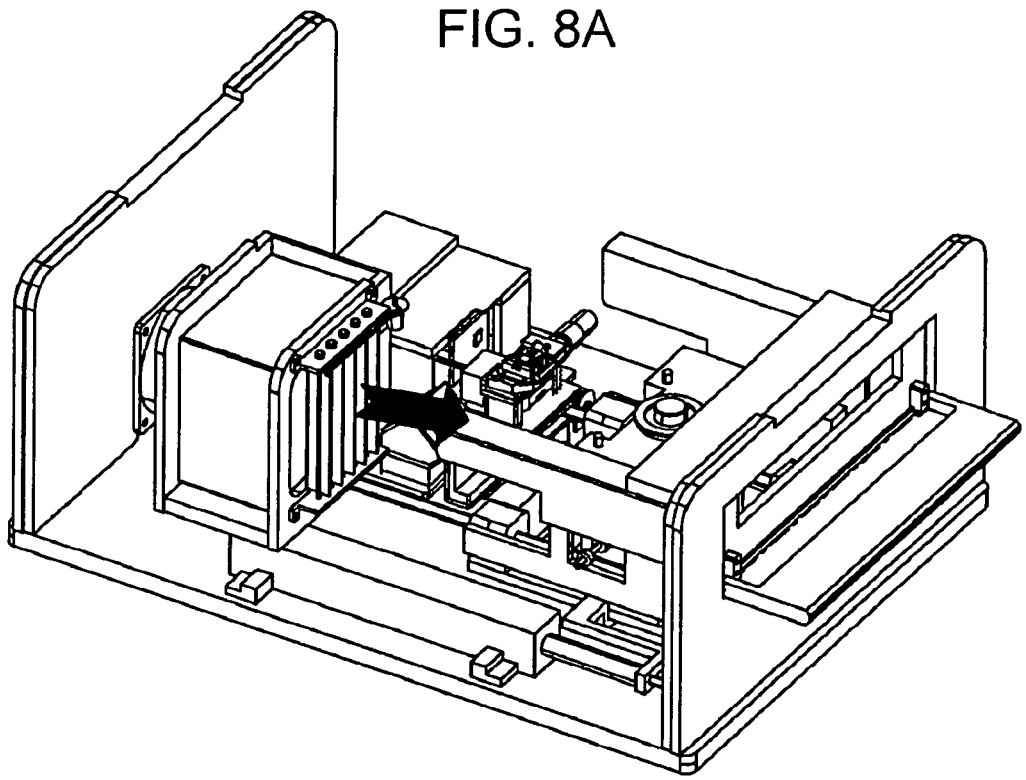
FIGS. 8A and 8B are explanatory views showing how to adjust the direction of air by an air-direction adjusting unit in the embodiment.
Figure 8B:
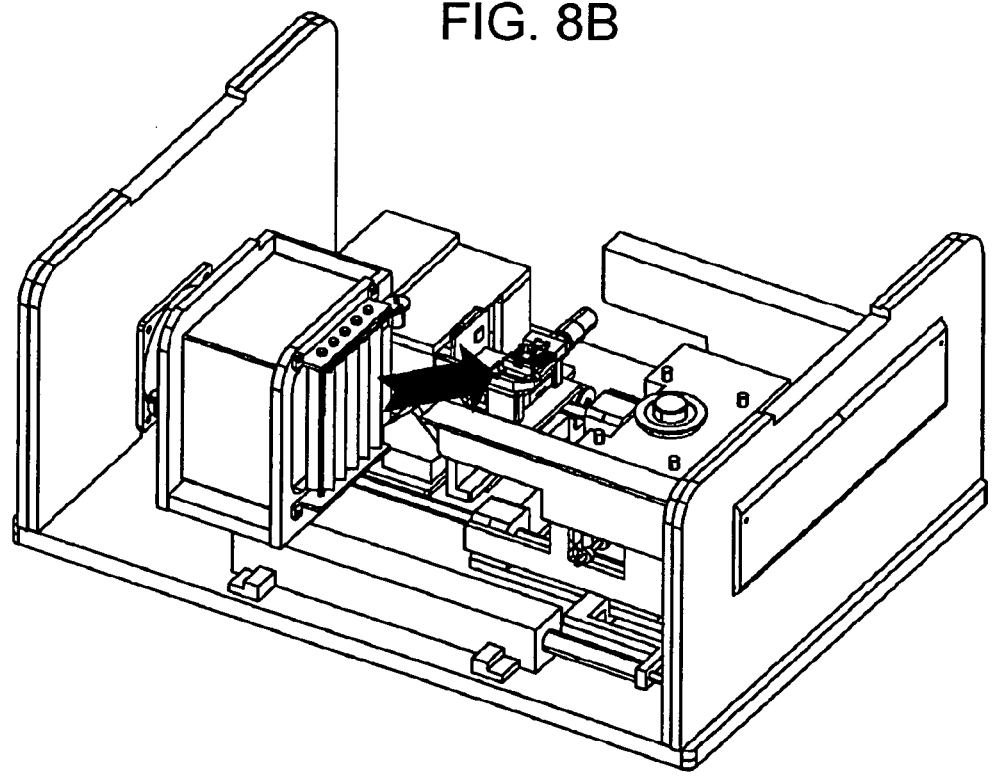

FIGS. 8A and 8B explain the adjustment of air direction by the air-direction adjuster 150. FIG. 8A shows a state in which air is sent to the clamp 110. It is useful to send air so as to prevent dust from adhering onto the clamp hub 111 when an optical disc is not loaded in the clamp 110 and particularly when the optical disc is going to be loaded in the clamp 110.

FIG. 8B shows a state in which air is sent to the actuator 120 and its surroundings. While an optical disc is loaded in the clamp 110, it is useful to send air so that dust does not enter between the objective lens and the optical disc.

In this way, the air direction is switched by the air-direction adjuster 150 so that air is sent to the clamp 110 or the actuator 110, depending on whether an optical disc is loaded or unloaded in the camp 110.

Figure 9:
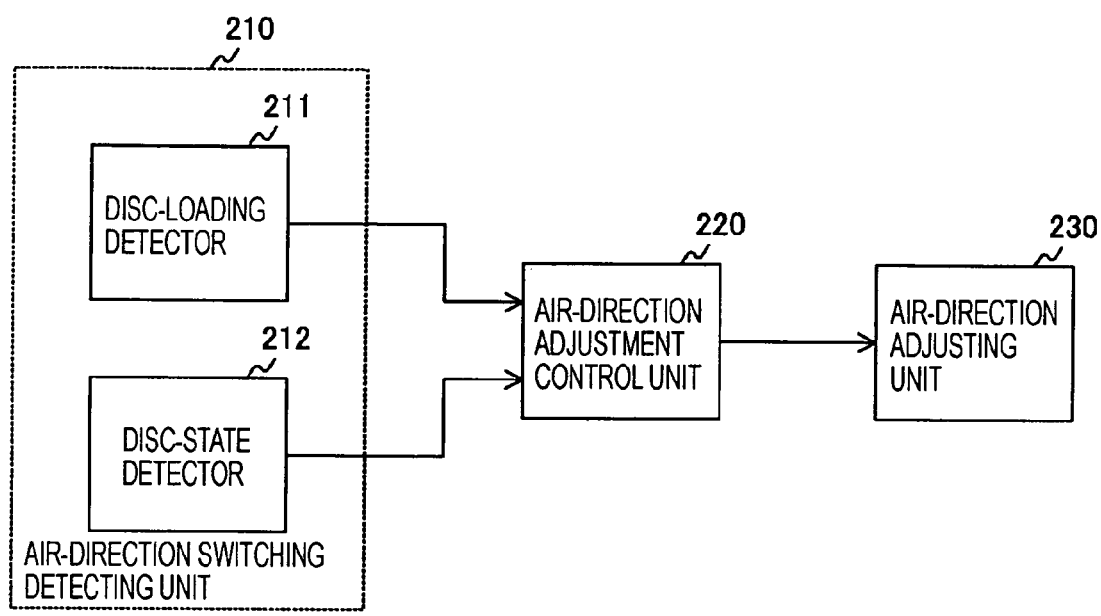
FIG. 9 is a block diagram of a system for adjusting the air direction in the embodiment.

FIG. 9 is a block diagram showing a system for adjusting the air direction. An air-direction switching detecting unit 210 detects the relationship between the optical disc and the clamp 110, and thereby detects the timing of switching the air direction. The air-direction switching detecting unit 210 includes a disc-loading detector 211 and a disc-state detector 212. The disc-loading detector 211 detects whether a loading operation of clamping an optical disc in the clamp 110 is being performed. The disc-state detector 212 detects whether an optical disc is clamped in the clamp 110. That is, the disc-loading detector 211 detects the operation, and the disc-state detector 212 detects the state. While both the detectors can be provided, the function of the air-direction switching detecting unit 210 can be served even by one of the detectors. As the disc-loading detector 211 and the disc-state detector 212, sensors can be provided near the sled unit 180 and the clamp 110.

An air-direction adjustment control unit 220 determines the air direction on the basis of the detection result by the air-direction switching detecting unit 210. That is, when the disc-loading detector 211 detects that a loading operation of clamping an optical disc in the clamp 110 is being performed, the air-direction adjustment control unit 220 determines to send air to the clamp 110. In other cases, the air-direction adjustment control unit 220 determines to send air to the actuator 120. The air-direction adjustment control unit 220 determines to send air to the actuator 120 when the disc-state detector 212 detects that the optical disc is clamped in the clamp 110, and determines to send air to the clamp 110 when the optical disc is not clamped in the clamp 110.

An air-direction adjusting unit 230 adjusts the air direction on the basis of the determination made by the air-direction adjustment control unit 220. Specifically, the air-direction adjusting unit 230 is embodied by the air-direction adjuster 150 shown in FIG. 5. That is, when the motor 151 is operated in response to a control signal from the air-direction adjustment control unit 220 to move the louvers 152, air is sent to the clamp 110 or the actuator 120.

Figure 10A:
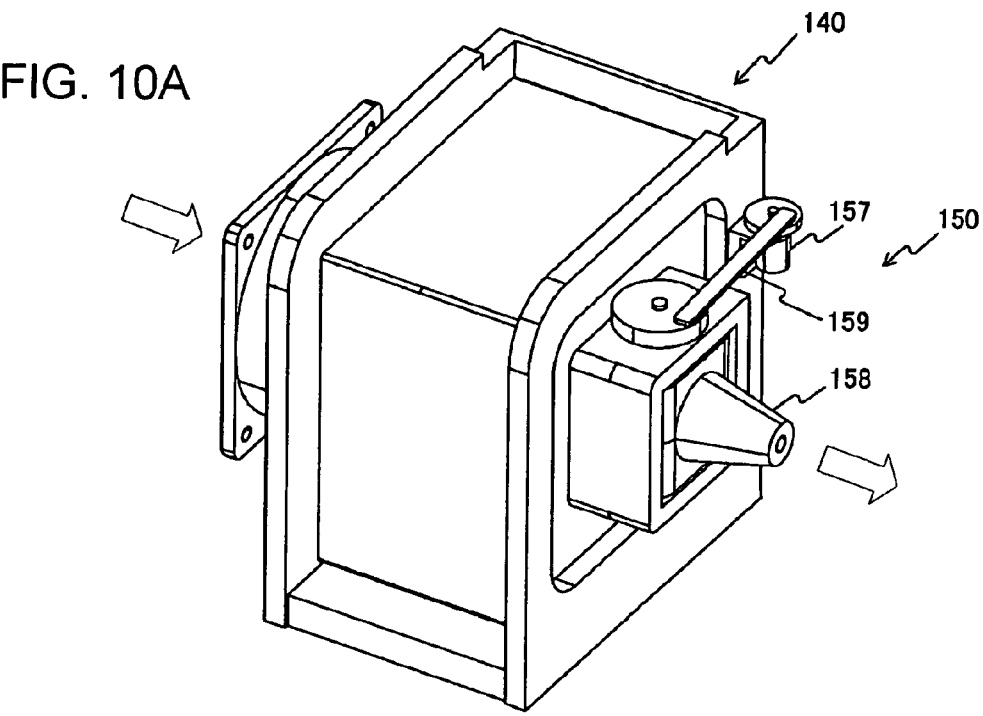
FIGS. 10A and 10B are assembly views of a modification of the blower.
Figure 10B:
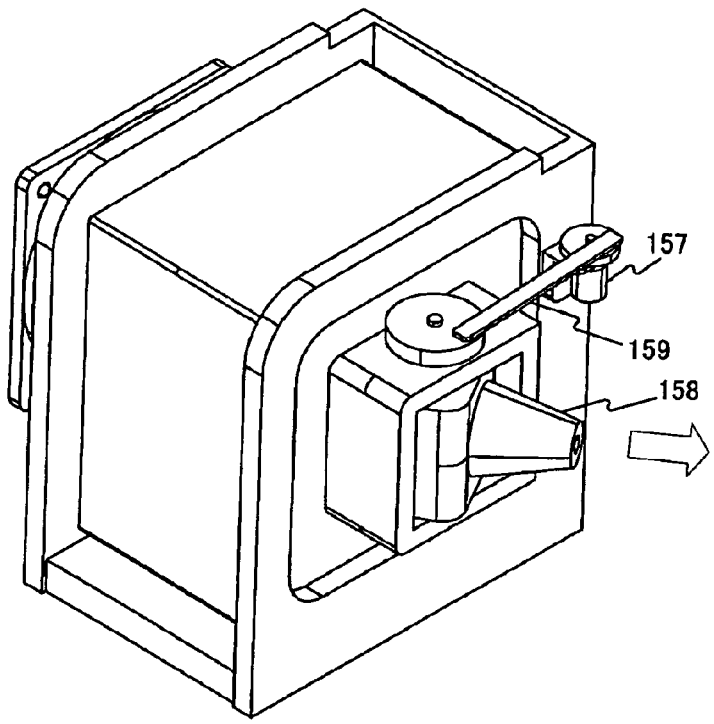

FIGS. 10A and 10B illustrate a modification of the blower 140. The blower 140 includes a nozzle 158 serving as the air-direction adjuster 150. The nozzle 158 rotates with the movement of a link 159 under the control of a motor 157.

FIG. 10A shows a state in which air is sent to the clamp 110, similarly to FIG. 8A. In contrast, FIG. 10B shows a state in which air is sent to the actuator 120 and its surroundings, similarly to FIG. 8B. The modification shown in FIGS. 10A and 10B is similar in basic principle to the blower 140 shown in FIG. 5 except that the nozzle 158 is used instead of the louvers 152 as the mechanism for adjusting the air direction. Alternatively, other mechanisms may be adopted.

In this way, the air-direction adjustment control unit 220 determines to which of the clamp 110 and the actuator 120 air is sent, on the basis of the relationship between the optical disc and the clamp 110 detected by the air-direction switching detecting unit 210. The air-direction adjuster 150 can adjust the air direction on the basis of the determination of the air-direction adjustment control unit 220.

While the blower 140 is disposed in the right rear portion of the interior of the housing in the above-described embodiment, the position of the blower 140 can be appropriately determined depending on the arrangement of other mechanisms in the housing.

It should be understood by those skilled in the art that various modifications, combinations, sub-combinations and alterations may occur depending on design requirements and other factors insofar as they are within the scope of the appended claims or the equivalents thereof.

What is claimed is:

1. A recording-medium driving apparatus comprising:
   loading means in which a removable recording medium is loaded;
   access means that accesses the recording medium loaded in the loading means;
   detecting means that detects the relationship between the recording medium and the loading means;
   air-direction adjustment control means that determines to which of the loading means and the access means air is sent, on the basis of the detection performed by the detecting means; and
   blower means that sends the air to one of the loading means and the access means on the basis of the determination made by the air-direction adjustment control means.

2. A disc apparatus comprising:
   clamp means that clamps a disc-shaped removable recording medium;
   pickup means that performs reading from and writing onto the recording medium clamped by the clamp means;
   detecting means that detects the relationship between the recording medium and the clamp means;
   air-direction adjustment control means that determines to which of the clamp means and the pickup means air is sent, on the basis of the detection performed by the detecting means; and
   blower means that sends the air to one of the clamp means and the pickup means on the basis of the determination made by the air-direction adjustment control means.

3. The disc apparatus according to claim 2, wherein the detecting means detects whether a loading operation of clamping the recording medium by the clamp means is being performed, and
   wherein the air-direction adjustment control means determines to send the air to the clamp means when the loading operation is being performed, and determines to send the air to the pickup means when the loading operation is not being performed.

4. The disc apparatus according to claim 2, wherein the detecting means detects whether the recording medium is clamped by the clamp means, and
   wherein the air-direction adjustment control means determines to send the air to the pickup means when the recording medium is clamped by the clamp means, and determines to send the air to the clamp means when the recording medium is not clamped by the clamp means.

5. The disc apparatus according to claim 2, wherein the blower means includes:
   suction means that sucks air; and
   air-direction adjusting means that adjusts the direction of the air sucked by the suction means on the basis of the determination made by the air-direction adjustment control means.

6. The disc apparatus according to claim 5, wherein the air-direction adjusting means includes at least one louver.

7. The disc apparatus according to claim 5, wherein the air-direction adjusting means includes at least one nozzle.

8. The disc apparatus according to claim 5, wherein the blower means further includes cleaning means that cleans the air sucked by the suction means, and
   wherein the air-direction adjusting means adjusts the direction of the air cleaned by the cleaning means.

9. A disc apparatus comprising:
   clamp means that clamps an optical disc serving as a removable recording medium;
   optical pickup means that performs reading from and writing onto the optical disc clamped by the clamp means;
   detecting means that detects the relationship between the optical disc and the clamp means;
   air-direction adjustment control means that determines to which of the clamp means and the pickup means air is sent, on the basis of the detection performed by the detecting means; and
   blower means that sends the air to one of the clamp means and the optical pickup means on the basis of the determination made by the air-direction adjustment control means.

10. The disc apparatus according to claim 9, wherein the optical pickup means includes an objective lens having a numerical aperture of 1 or more.

11. The disc apparatus according to claim 10, wherein the objective lens is a solid immersion lens.

12. A disc apparatus hermetically sealed by a housing, the disc apparatus comprising:
    clamp means that clamps a disc-shaped removable recording medium;
    pickup means that performs reading from and writing onto the recording medium clamped by the clamp means;
    detecting means that detects the relationship between the recording medium and the clamp means;
    air-direction adjustment control means that determines to which of the clamp means and the pickup means air is sent, on the basis of the detection performed by the detecting means; and
    blower means that sends the air to one of the clamp means and the pickup means on the basis of the determination made by the air-direction adjustment control means.

13. The disc apparatus according to claim 12, wherein the blower means includes:
    suction means that sucks air;

filter means that cleans the air sucked by the suction means; and air-direction adjusting means that adjusts the direction of the air cleaned by the filter means on the basis of the determination made by the air-direction adjustment control means, and wherein the housing has an opening through which the filter means is attached and detached.

14. A recording-medium driving apparatus comprising:

a loading unit in which a removable recording medium is loaded;

an access unit that accesses the recording medium loaded in the loading unit;

a detector that detects the relationship between the recording medium and the loading unit;

an air-direction adjustment controller that determines to which of the loading unit and the access unit air is sent, on the basis of the detection performed by the detector; and a blower that sends the air to one of the loading unit and the access unit on the basis of the determination made by the air-direction adjustment controller.

15. A disc apparatus comprising:

a clamp that clamps a disc-shaped removable recording medium;

a pickup that performs reading from and writing onto the recording medium clamped by the clamp;

a detector that detects the relationship between the recording medium and the clamp;

an air-direction adjustment controller that determines to which of the clamp and the pickup air is sent, on the basis of the detection performed by the detector; and a blower that sends the air to one of the clamp and the pickup on the basis of the determination made by the air-direction adjustment controller.

16. A disc apparatus comprising:

a clamp that clamps an optical disc serving as a removable recording medium;

an optical pickup that performs reading from and writing onto the optical disc clamped by the clamp;

a detector that detects the relationship between the optical disc and the clamp;

an air-direction adjustment controller that determines to which of the clamp and the pickup air is sent, on the basis of the detection performed by the detector; and a blower that sends the air to one of the clamp and the optical pickup on the basis of the determination made by the air-direction adjustment controller.

17. A disc apparatus hermetically sealed by a housing, the disc apparatus comprising:

a clamp that clamps a disc-shaped removable recording medium;

a pickup that performs reading from and writing onto the recording medium clamped by the clamp;

a detector that detects the relationship between the recording medium and the clamp;

an air-direction adjustment controller that determines to which of the clamp and the pickup air is sent, on the basis of the detection performed by the detector; and a blower that sends the air to one of the clamp and the pickup on the basis of the determination made by the air-direction adjustment controller.

* * * * *